United States Patent [19]

Klaenhammer et al.

[11] 4,023,888

[45] May 17, 1977

[54] FLASHING RETROREFLECTING DEVICE

[75] Inventors: Bryan L. Klaenhammer, Hugo; William H. Long, Woodbury, both of Minn.

[73] Assignee: Minnesota Mining and Manufacturing Company, St. Paul, Minn.

[22] Filed: Sept. 12, 1975

[21] Appl. No.: 612,754

[52] U.S. Cl. .................................. 350/99; 350/211; 350/271; 350/285
[51] Int. Cl.² ........................................ G02B 5/12
[58] Field of Search ............... 350/99, 97, 98, 100, 350/104, 103, 211, 106, 205, 266, 274, 285, 271, 272, 275; 301/37 SA; 280/281 R

[56] References Cited

UNITED STATES PATENTS

| | | | |
|---|---|---|---|
| 2,503,509 | 4/1950 | Rader | 350/99 |
| 2,551,193 | 5/1951 | Williams | 350/99 |
| 3,528,721 | 9/1970 | La Londe | 350/99 |
| 3,551,024 | 12/1970 | Priest, Jr. | 350/106 |
| 3,758,190 | 9/1973 | Douglas | 350/97 |
| 3,813,146 | 5/1974 | Burch et al. | 350/274 |
| 3,814,500 | 6/1974 | Ebenbichler | 350/97 |
| 3,861,785 | 6/1975 | Barbour | 350/211 |

Primary Examiner—John K. Corbin
Assistant Examiner—B. Wm. de los Reyes
Attorney, Agent, or Firm—Cruzan Alexander; Donald M. Sell; William B. Barte

[57] ABSTRACT

A reflecting device providing a flashing reflection of light incident on the device toward an intended observer includes a converging Fresnel lens for receiving light directed onto the device and for focusing the light within the focal plane of the lens, through which plane a reflector is periodically moved to intermittently reflect the light. In one embodiment, the reflector is positioned to retroreflect the light back through the lens toward an observer positioned adjacent the source of light. In another embodiment, the reflector is positioned to reflect light transmitted through a first Fresnel lens toward another Fresnel lens so as to be visible by an observer of the other lens.

13 Claims, 6 Drawing Figures

U.S. Patent May 17, 1977 Sheet 1 of 2 4,023,888
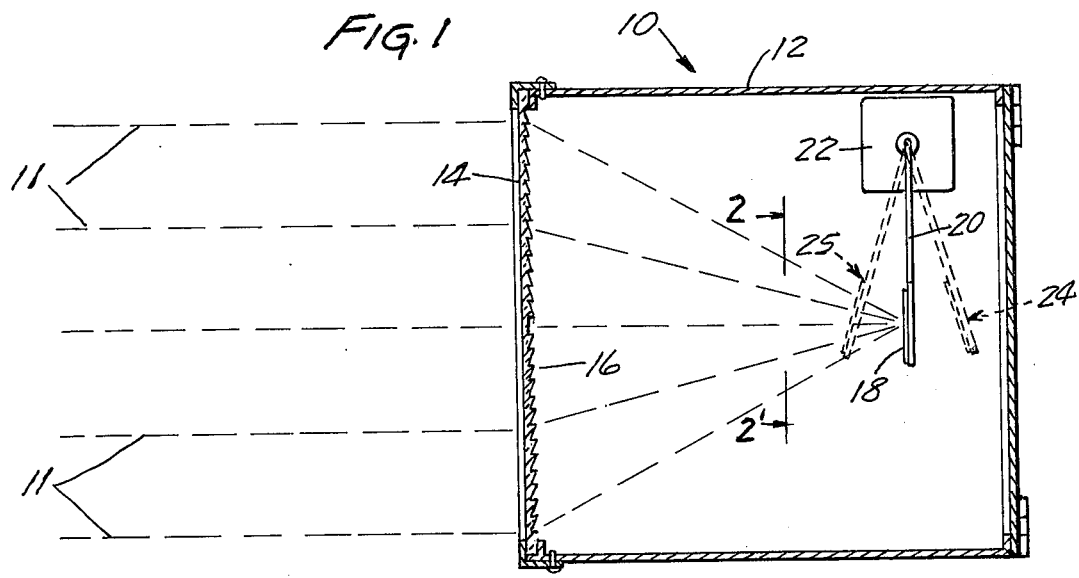
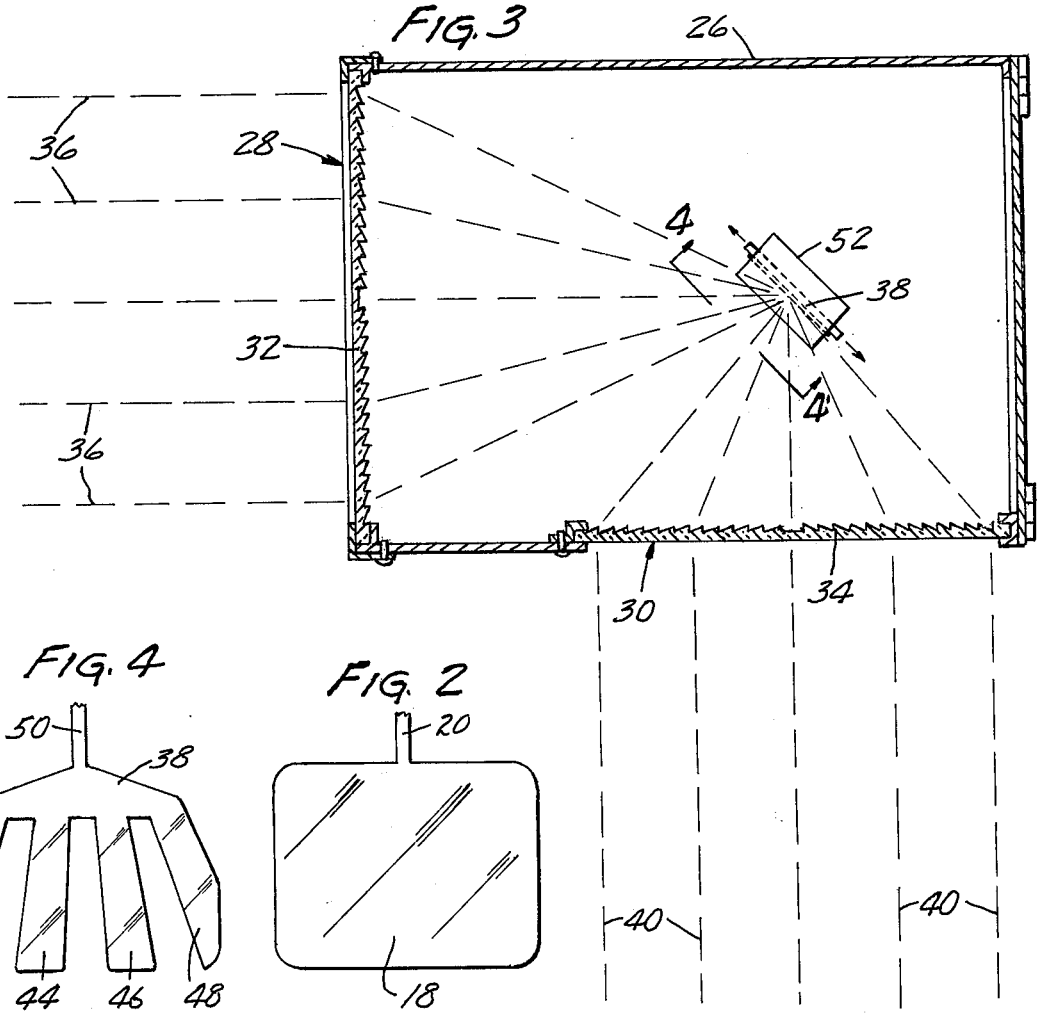
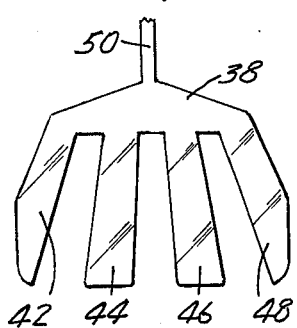
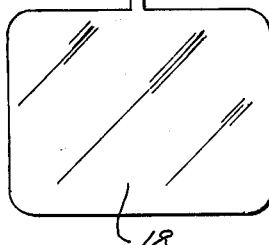

FLASHING RETROREFLECTING DEVICE

BACKGROUND OF THE INVENTION

1. Field of the Invention

This invention relates to reflecting and/or self illuminated devices such as are useful in alerting motorists to the presence of other vehicles and road hazards.

2. Description of the Prior Art

It has long been appreciated that a flashing light is much more effective in alerting observers, such as motorists, of the presence of a potential danger, be it in the form of an oncoming vehicle, road hazard or the like. Accordingly, battery operated road hazard warning lights are known in which a light is caused to repetitively flash on and off. Reflectorized devices are also known wherein light such as from vehicle headlights is intermittently reflected to provide a flashing effect by physically moving the device. In one embodiment depicted in U.S. Pat. No. 3,528,721 (LaLonde), such movement is obtained by mounting the device against the wheel of a bicycle so that rotation of the wheel causes the reflector to oscillate back and forth. U.S. Pat. No. 3,551,024 (Priest) discloses a flashing retroreflective reflector in which a convex lens focuses incoming light on a retroreflective medium such as a cube-corner material. The device is designed to be oscillated such that retroreflection is obtained only when incoming light is incident along the axis of the lens.

SUMMARY OF THE INVENTION

The device of the present invention provides a periodically varying reflection of light incident on the device such as that provided by vehicle headlights to accentuate the detection of the reflected light, affording a signal to an observer.

In contrast to prior art devices in which the entire device must be moved to provide a flashing effect, the signalling device of the present invention includes a housing which may be, and which is preferably stationary during use. The housing is provided with at least one opening in which is positioned at least one converging Fresnel lens for receiving light. A reflector within the housing substantially at the focal plane of the light receiving lens receives and reflects light from the light receiving lens along an optical path toward one Fresnel lens. A reflectance control means is also provided for varying the optical path so that a flashing signal light is presented to an observer of the device. In a preferred embodiment, the reflectance control means comprises means for supporting the reflector and drive means such as a motor and escapement mechanism to periodically move the reflector to thereby vary the optical path, such as by passing the reflector in and out of the focal plane of the lens or by providing spaced segments in the reflector to periodically interrupt the reflection.

BRIEF DESCRIPTION OF THE DRAWING

FIG. 1 is a cross-sectonal side view of one embodiment of the apparatus of the present invention;

FIG. 2 is a partial sectonal side view of the embodiment shown in FIG. 1 taken along the lines designated as 2,2';

FIG. 3 is a cross-sectional top view of another embodiment of the present invention;

FIG. 4 is a partial sectional side view of the embodiment shown in FIG. 3 taken along the lines 4,4';

DESCRIPTION OF THE PREFERRED EMBODIMENTS

Figure 5:
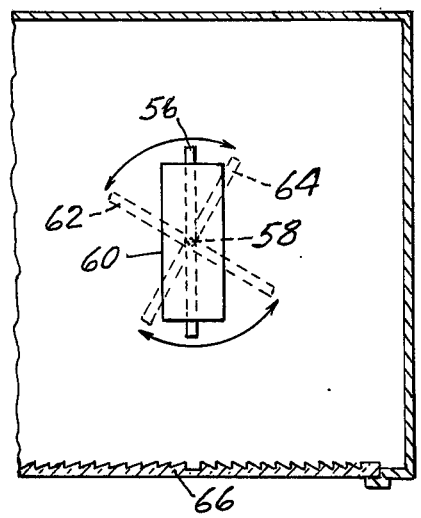
FIG. 5 is a partial sectional top view of another embodiment of the present invention.

FIG. 1 shows a preferred embodiment of the present invention comprising a reflective device 10 for reflecting light incident on the device 10, such as rays 11, back in the direction from whence they came. The apparatus 10 includes a housing 12 having an opening 14 in which a Fresnel lens 16 is mounted. In a preferred embodiment, such a lens, approximately 11 inches square and having a focal length of about 8 inches, such as may be obtained from Edmund Scientific Co., Barrington, N.J., is preferred. A reflector 18, such as planar mirror, is positioned substantially at the focal plane of the Fresnel lens 16, and is mounted on a shaft 20, to form a pendulum which is in turn driven by a clock motor and escapement mechanism 22. The oscillatory motion of the mirror 18 is conveniently provided by a clock type motor such as either a 400-day spring wound motor or a conventional low voltage DC clock motor and associated escapement mechanism. A preferred such motor and escapement mechanism is manufactured by PRIMEX Corp., Williams Bay, Wisconsin, as Model 240-13-BR. As the pendulum oscillates, the mirror 18 moves from its rest position to and fro to the positions shown in dashed lines 24 and 25 so as to move in and out of the focal plane of the lens 16 and thereby periodically change the reflected image. When the mirror 18 is at the focal plane of the lens 16, light focused through the lens is retroreflected through the lens and along paths 11 toward the source of the incoming light. Retroreflectively is only achieved when the mirror 18 is actually within the focal plane of the lens 16. This periodically changing of the reflection of the light is seen by an observer positioned proximate the source of light as a flashing of the reflected light.

FIG. 2 is a cross-sectional view taken along the lines 2,2' of FIG. 1 showing the reflector 18 to comprise a planar mirror mounted on the shaft 20.

FIG. 3 is another embodiment of the present invention wherein the housing 26 includes two openings 28 and 30 in which Fresnel lenses 32 and 34 are positioned. In this embodiment, the reflector is positioned within the housing 26 at a 45° angle such that light incident upon either of the lenses 32 or 34 such as directed along rays 36 and 40 is focused by one of the lenses 32 or 34 upon the mirror 38 and thence is reflected onto the other of the lenses 32 or 34 and outward along the rays 36 or 40. In this manner, an observer positioned at right angles to the source of incoming light may be alerted to the presence of a potential hazard. In the embodiment shown in FIG. 3, the mirror 38, as is shown in detail in FIG. 4, comprises a planar reflector having a plurality of segments 42, 44, 46 and 48 and is mounted on a shaft 50 to form a pendulum driven by a clock motor and escapement mechanism 52. In this embodiment, the mirror is oscillated from side to side such that light focused by the lens 32 is periodically interrupted by the spaces between each of the segments of the mirror 38 so as to provide a flashing effect to an observer of the light directed along the rays 40. As in the embodiment shown in FIG. 1, the motor and escapement mechanism 52 of the embodiment shown in FIGS. 3 and 4 may be a conventional clock motor such as a 400-day spring wound motor or a low voltage DC powered clock motor and associated escapement mechanism.

FIG. 5 shows another embodiment of the present invention, similar to that shown in FIGS. 3 and 4, but wherein a solid mirror 56 is rotated about a vertical axis 58 by a motor and escapement mechanism 60. As the mirror thus rotates within the limits shown by the outer positions 62 and 64, ligh incoming through a first lens (not shown) such as lens 32 of FIG. 3 will be periodically reflected both back through the first lens and through the second lens 66, thereby alerting observers positioned along the axis of both lenses to the presence of the device. While only a partial rotation of a planar mirror is shown, it is also within the scope of the present invention that the mirror may be continuously rotated in a single direction and that a multifaceted mirror may be desirably so employed.

Figure 6:
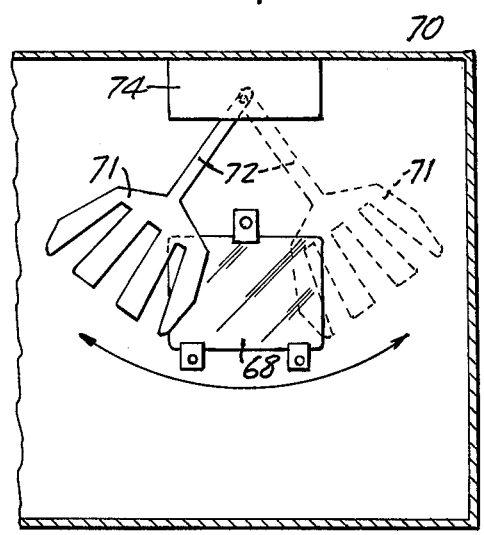
FIG. 6 is a partial sectional front view of yet another embodiment of the present invention.

FIG. 6 shows yet another embodiment of the present invention in which a mirror 68 is rigidly mounted in the housing 70 at or near the focal plane of a lens (not shown) and an oscillating shutter 71 having a number of spaced segments is supported by shaft 72 and oscillated by the motor 74 in front of the mirror 68 to thereby periodically interrupt the reflected light.

It is also within the scope of the present invention that the reflector, whether rigidly or pivotally mounted, may be a planar mirror, a type of retroreflecting media, focusing mirror, or other type of reflecting device. The reflector may also contain a number of reflecting faces such that incoming light is periodically reflected toward whatever lenses are provided for focusing and directing the reflected light along desired directions.

In addition to the embodiments shown in FIGS. 1–6, wherein the reflector or shutter is mounted as a pendulum below a conventional clock motor and escapement mechanism, a variety of other means for suporting and for periodically moving the reflector or shutter and for electrically varying the optical path are likewise within the scope of the present invention.

The reflecting devices set forth in the embodiments hereinabove are useful in a variety of various areas. For example, various colors of reflected light may be provided by utilizing appropriate color filters, colored lenses or colored mirrors. For example, a red filter may be provided such that red light is reflected as a result of a vehicle headlight hitting the device.

Devices constructed in accordance with the present invention are particularly useful in relatively permanent installations such as bridge abutments, exit ramps from freeways, railroad crossings, warning signs where particular attention to a road hazard is desired, as well as in advertising displays where additional attention-getting capability is desired. The embodiment shown in FIGS. 3 and 4, wherein a right angle reflection of the incoming light is provided, is particularly desirable at T intersectons and railroad crossings where the headlight of an oncoming vehicle may now be readily detected by motorists or locomotive engineers positioned at right angles to the other oncoming vehicles.

In addition to such permanent installations, the device of the present invention also has applicability in temporary installations such as at construction barricades, installation on the rear end of semi-trailers, in emergency vehicles, and the like.

Having thus described the present invention, what is claimed is:

1. In a signalling device comprising a housing; a lens positioned in an opening in said housing for receiving light, a reflector within said housing substantially at the focal plane of said light receiving lens, which reflector receives and reflects light from said light receiving lens along an optical path toward said lens, and reflectance control means for varying said optical path, the improvement wherein said lens comprises at least one converging Fresnel lens and said reflectance control means includes means periodically interposed into said optical path to thereby vary said path, said reflectance control means comprising a support means for supporting said reflector and drive means for oscillating said support to cause said reflector to periodically move to thereby vary said optical path, whereby light incident on said device such as that provided by vehicle headlights is periodically variably reflected, thus accentuating the detection of the reflected light, affording a flashing signal light to an observer of said device.

2. A device according to claim 1, wherein said reflector has a plurality of spaced segments and is mounted on said support means for periodic movement such that light directed through said light receiving lens is reflected by successive segments during said periodic movement.

3. A device according to claim 1, wherein said drive means moves said support means periodically for moving said reflector across the axis of said lens to at least once during the said periodic movement position said reflector within said optical plane.

4. A device according to claim 1, wherein said drive means moves said support means periodically for moving said reflector parallel to the axis of said lens to at least once during the said periodic movement position said reflector at said focal plane.

5. A device according to claim 1, wherein said drive means moves said support means for periodically rotating said reflector.

6. A device according to claim 1, wherein said drive means comprises a motor and escapement mechanism coupled to said support.

7. In a signalling device comprising a housing; a lens positioned in an opening in said housing for receiving light, a reflector within said housing substantially at the focal plane of said light receiving lens, which reflector receives and reflects light from said light receiving lens along an optical path toward said lens, and reflectance control means for varying said optical path, the improvement wherein said lens comprises at least one converging Fresnel lens and said reflectance control means includes means periodically interposed into said optical path to thereby vary said path, whereby light incident on said device such as that provided by vehicle headlights is periodically variably reflected, thus accentuating the detection of the reflected light, affording a flashing signal light to an observer of said device, wherein said reflectance control means comprises a support means for rigidly positioning said reflector within said housing and drive means coupled to a light shutter for periodically interrupting light incident on said reflector.

8. In a signalling device comprising a housing; a lens positioned in an opening in said housing for receiving light, a reflector within said housing substantially at the focal plane of said light receiving lens, which reflector receives and reflects light from said light receiving lens along an optical path toward said lens, and reflectance control means for varying said optical pth, the improvement wherein said lens comprises at least one converging Fresnel lens and said reflectance control means includes means periodically interposed into said optical path to thereby vary said path, whereby light incident on said device such as that provided by vehicle headlights is periodically variably reflected, thus accentuating the detection of the reflected light, affording a flashing signal light to an observer of said device, further comprising a second Fresnel lens positioned in another opening in said housing at an angle with respect to said light receiving lens, said reflector is mounted to reflect light passing through said light receiving lens along an optical path through said second lens to alert an observer viewing said second Fresnel lens to the presence of said light.

9. A device according to claim 8, wherein said second lens is mounted at 90° with respect to said light receiving lens.

10. A device according to claim 8, wherein said reflectance control means comprises
support means for supporting said reflector, and
drive means for oscillating said support to cause said reflector to periodically move to thereby vary said optical path.

11. A device according to claim 10, wherein said drive means moves said support means periodically for moving said reflector across the axis of said lens to at least once during the said periodic movement position said reflector within said optical plane.

12. A device according to claim 10, wherein said drive means moves said support means periodically for moving said reflector parallel to the axis of said lens to at least once during the said periodic movement position said reflector at said focal plane.

13. A device according to claim 10, wherein said drive means moves said support means for periodically rotating said reflector.

* * * * *